(12) United States Patent
Ho et al.

(10) Patent No.: US 11,017,190 B1
(45) Date of Patent: *May 25, 2021

(54) APPARATUS AND METHOD FOR LOCATING A SERVICE OBJECT BASED ON A LABEL

(71) Applicants: Chi Fai Ho, Palo Alto, CA (US); Augustine Junda Ho, Palo Alto, CA (US)

(72) Inventors: Chi Fai Ho, Palo Alto, CA (US); Augustine Junda Ho, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/031,880

(22) Filed: Sep. 24, 2020

Related U.S. Application Data

(63) Continuation of application No. 15/991,874, filed on May 29, 2018, now Pat. No. 10,817,688.

(51) Int. Cl.
*G06K 7/10* (2006.01)
*B25J 9/16* (2006.01)

(52) U.S. Cl.
CPC .......... *G06K 7/10861* (2013.01); *B25J 9/162* (2013.01); *B25J 9/1679* (2013.01); *B25J 9/1697* (2013.01)

(58) Field of Classification Search
CPC ..... G06K 7/10861; B25J 9/162; B25J 9/1697; B25J 9/1679
USPC ..................................... 700/24, 259
See application file for complete search history.

(56) References Cited

U.S. PATENT DOCUMENTS

| | | | |
|---|---|---|---|
| 9,805,240 B1* | 10/2017 | Zheng ................ | G06K 7/1443 |
| 2011/0168774 A1* | 7/2011 | Magal ................ | G06K 7/1099 235/375 |
| 2017/0219338 A1* | 8/2017 | Brown ................ | G01S 7/4808 |
| 2017/0227645 A1* | 8/2017 | Swope ................ | G01S 17/42 |

* cited by examiner

*Primary Examiner* — Jaime Figueroa
(74) *Attorney, Agent, or Firm* — North Shore Patents, P.C.

(57) ABSTRACT

A service rendering system locates a service object based on a label. A controller of the service rendering system receives an image captured by a camera coupled to the controller, processes the image to identify a label image in the image, identifies a label in the label image as corresponding to the service object, and obtains a service point location encoded in the label, where the service point location comprises a location relative to a location of the label. The controller calculates a label position of the label using the image of the label and calculates a service point position using the service point location and the label position.

27 Claims, 11 Drawing Sheets

APPARATUS AND METHOD FOR LOCATING A SERVICE OBJECT BASED ON A LABEL

BACKGROUND OF THE INVENTION

Field

This invention relates generally to the locating of a service object based on a label, and more specifically, to a service rendering system equipped with an image sensor controller for rendering a service according to information on a service label image captured by the image sensor.

Related Art

Many optical cameras, either RGB cameras or night vision cameras are capable of capturing high quality images. Mounting the cameras onto a service rendering machine allows the service rendering machine to autonomously recognize the object requesting the service through processing a captured image of the object. For example, industrial robotic arms equipped with cameras are capable of performing repairs, putting on screws, assembling, and other mechanical procedures onto the object.

These robotic arms are typically stationary, and the objects need to be transported to be near the robotic arms or to a pre-determined position where the robotic arms can service the objects. These robotic arms are not equipped to work in a wider or open area where the robotic arms would be required to move to the objects in order to service the objects.

For example, in a shopping mall, the mall owner may want a security check to be conducted after the mall is closed. The security check may include: locking doors; backing up surveillance cameras' video footage; charging security sensors and capturing data backup; emptying or filling containers such as garbage bins, hand sanitizers, and soap dispensers; charging electronic devices; and servicing other electronic or mechanical devices before the mall opens again. Typically, the mall owner hires custodians to perform the tasks. However, many devices and gadgets, such as cameras and sensors, are installed in hard to reach places. Special services need to be scheduled for technical crew to service these exceptional devices and gadgets. It would be more effective and efficient for the mall owner to deploy an autonomous service rendering vehicle to reach and service all objects.

In another scenario on a university campus, the school may want to install security devices (e.g. smart light poles, security cameras and sensors, and smart door locks) throughout the campus, cost-efficient autonomous delivery and utility vehicles or carts, smart landscape with sensors, and/or smart solar panels and other smart devices and sensors. These smart electronic computing devices and vehicles require regular maintenance such as electric charging, re-calibration, adjustments, data download, material refill, cleaning, content removing, or component replacement, etc. These devices are likely installed in small areas, high location, hard to reach places, or in places beyond reach of human technicians but requiring special accessing tools. It is desirable and necessary for the devices to be serviced by an autonomous service rendering vehicle that can locate and reach these devices.

In one scenario in an airport, a number of mobile service and vending kiosks may be deployed throughout the airport. These kiosks may be autonomous and move from one location to another location from time to time. The airport may wish for the kiosk battery cells replaced from time to time at their current location instead of moving the kiosks back to their charging stations. It is therefore desirable for an autonomous service rendering vehicle to locate and service the kiosks. The service rendering vehicle can replace or recharge the battery cells, refill products within the kiosks, repair, replace or update hardware and software components of the kiosks.

In order to perform the services above, the service rendering vehicle requires a precise position of a service point in order to move to a service object and to render the service on a service object.

BRIEF SUMMARY OF THE INVENTION

Disclosed herein is a method for locating a service object by a service rendering system and a corresponding apparatus and a computer readable medium as specified in the independent claims. Embodiments of the present invention are given in the dependent claims. Embodiments of the present invention can be freely combined with each other if they are not mutually exclusive.

According to one embodiment of the present invention, in a method for locating a service object by a service rendering system, a controller of the service rendering system receives an image captured by a camera coupled to the controller, processes the image to identify a label image in the image, identifies a label in the label image as corresponding to the service object, and obtains a service point location encoded in the label, where the service point location comprises a location relative to a location of the label. The controller calculates a label position of the label using the image of the label and calculates a service point position using the service point location and the label position.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

Figure 1:
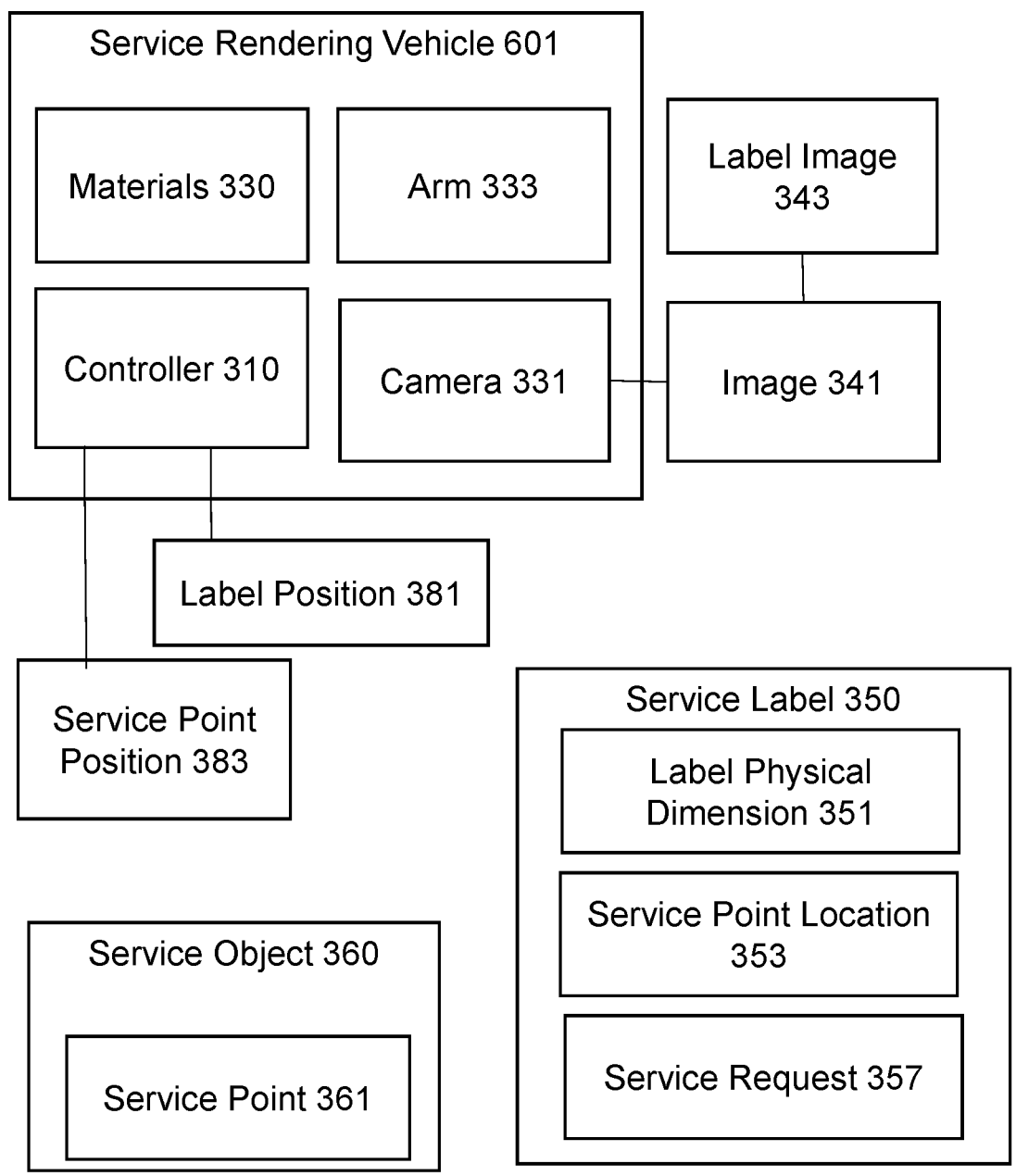
FIG. 1 illustrates an exemplary embodiment of a system of using a service rendering vehicle to autonomously render a service at a service point based on a service label.

FIG. 1 illustrates an exemplary embodiment of a system of using a service rendering vehicle to autonomously render a service at a service point based on a service label. In one embodiment, a service rendering vehicle 601 services a service object 360. Service rendering vehicle 601 may navigate in an area to locate service object 360 and render one or more services to service object 360. In one embodiment, service rendering vehicle 601 navigates in a shopping mall, a strip mall, an office, a business park, a building, a campus, an apartment, a residence home, a multi-tenant building, an airport or an area where service object 360 is to be found, and renders the service requested by a service request 357 for service object 360 at service point 361. In one embodiment, service rendering vehicle 601 identifies service object 360 via a service label 350, typically placed at a location near the service object 360. In one embodiment, service label 350 is a label posted on a wall, a window, a door or a pole near service object 360, or directly onto service object 360. In one embodiment, service rendering vehicle 601 includes a camera 331 taking a picture or an image 341 of an area that includes service label 350. Service rendering vehicle 601 identifies service label 360 using a label image 343 of service label 350 shown in the image 341. In one embodiment, service rendering vehicle 601 uses label image 343 to identify service label 350 and obtains information embedded within service label 350. In one embodiment, service label 350 includes label information such as label physical dimension 351, service point location 353 and service request 357. In one embodiment, the label information is encoded as a code, a number, or a piece of text into service label 350. In one embodiment, service label 350 encodes a network link such as a URL where the label information may be obtained. In one embodiment, service label 350 encodes directly part of the label information and a network link where the remainder of the label information may be obtained.

In one embodiment, service rendering vehicle 601 identifies service label 350 and obtains label physical dimension 351, service point location 353 and service request 357 from the service label 350. In one embodiment, service rendering vehicle 601 includes a processing controller 310, which uses the label physical dimension 351, image 341, label image 343, and attributes of camera 331 to calculate a label position 381 of service label 350. The calculated label position 381 indicates a position of service label 350 away from service rendering vehicle 601. In one embodiment, service rendering vehicle 601 includes a servicing arm 333 which can render services to service object 360. Label position 381 is calculated to be a relative position from arm 333. Upon calculating label position 381, controller 310 combines label position 381 and service point location 353, which indicates a location of service point 361 for service object 360, and to calculate a service point position 383 indicating a location of service point 361 relative to the location of the service rendering vehicle 601. In one embodiment, service point position 383 is calculated in relation to the location of the service rendering vehicle 601 and/or the arm 333.

In one embodiment, controller 310 instructs service rendering vehicle 601 and/or the arm 333 to navigate autonomously (i.e., without user intervention) towards service point position 383. In one embodiment, controller 310 instructs service rendering vehicle 601 to move, such that the service rendering vehicle 601 is in close proximity to the service point position 383, and then the controller 310 instructs the arm 333 to move to the service point position 383. In one embodiment, controller 310 instructs arm 333 to render one or more services at service point 361 of service object 360 according to information obtained from service request 357. In one embodiment, service request 357 includes information related to one or more of an authentication process, a data communication session, a wireless connection instruction, a physical operation, a lock (de)-activation instruction, a sensor command, a data download or retrieval instruction, a physical container or tray service instruction, a battery charging instruction, or other services to be rendered at service point 361. In one embodiment, service request 357 includes or encodes a plurality of computing instructions, and controller 310 executes the plurality of computing instructions in service request 357 in order to render the requested service.

In one embodiment, service rendering vehicle 601 includes materials 330 which may contain a data storage (not shown), which stores data for service request 357, a battery cell, a tray or container, a basket, or materials to fill service object 360.

Figure 2:
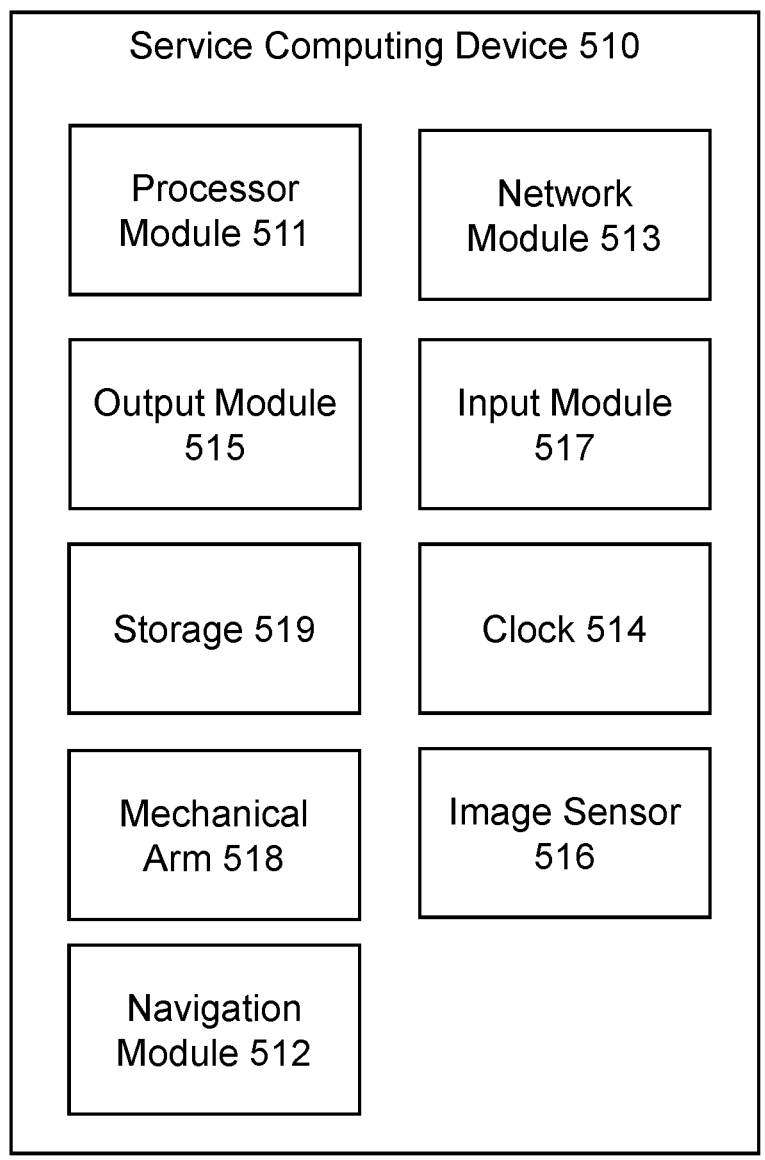
FIG. 2 illustrates an embodiment of a service computing device.

FIG. 2 illustrates an exemplary embodiment of hardware components of a service computing device which can be used for a service rendering vehicle, a controller or to house a controller. In one embodiment, service computing device 510 is a computing device including a processor module 511, an output module 515, an input module 517, and a storage 519. In one embodiment, computing device 510 may include a network module 513 or a clock 514. In one embodiment, processor module 511 includes one or more general processors, a multi-core processor, an application specific integrated circuit based processor, a system on a chip (SOC) processor or an embedded processor. In one embodiment, output module 515 includes or connects to a display for displaying video signals, images and text, and an audio speaker to play sound signals. In one embodiment, output module 515 includes a data interface such as USB, HDMI, DVI, DisplayPort, thunderbolt or a wire-cable connecting to a display or a speaker. In one embodiment, output module 515 connects to a display or a speaker using a wireless connection or a wireless data network. In one embodiment, input module 517 includes a physical or logical keyboard, buttons, keys, or microphones. In one embodiment, input module 517 includes or connects to one or more image sensor 516 such as a camera sensor, an optical sensor, a night-vision sensor, an infrared (IR) sensor, a motion sensor, a direction sensor, a proximity sensor, a gesture sensor, or other sensors that is usable to provide an input image to service computing device 510. In one embodiment, input module 517 includes a physical panel housing one or more sensors. In one embodiment, storage 519 includes a storage medium, a main memory, a hard disk drive (HDD), a solid state drive (SSD), a memory card, a ROM module, a RAM module, a USB disk, a storage compartment, a data storage component or other storage component. In one embodiment, network module 513 includes hardware and software to connect to a wireless data network such as a cellular network, a mobile network, a Bluetooth network, a NFC network, a personal area network (PAN), a WiFi network, or a LiFi network. In one embodiment, network module 513 connects to data network such as Internet, private data network, campus network, data center network, Ethernet network, home network, local area network, or a hotspot data network. Storage 519 includes executable instructions when read and executed by the processor module 511 of computing device 510 implement one or more functionalities of the current invention.

In one embodiment, service computing device 510 includes a mechanical arm 518 which may include one or joints that can be rotated, moved, extended, or retracted. In one embodiment, mechanical arm 518 is programmable and controlled by processor module 511 through one or more programmable instructions stored in storage 519. In one embodiment, mechanical arm 518 houses a hardware component of network module 513 such as an antenna, or a connector, allowing network module 513 to connect wirelessly or physically using mechanic arm 518. In one embodiment, mechanical arm 518 houses one or more sensors such as infrared sensors, temperature sensor, moisture sensor, smoke detector, sound or ultrasound microphone, or other sensors. In one embodiment, mechanical arm 518 houses one or more sprays or signal emitters such as near-infrared emitter, light emitter, sound and ultrasound speaker, heater, water/moisture spray, or air spray.

In one embodiment, service computing device 510 includes a navigation module 512 which may include one or more wheels, one or more legs, one or more air propellers, one or more rotor blades, or other hardware components allowing service computing device 510 to move, run, hover, fly, swim, elevate, or climb. In one embodiment, service computing device 510 includes autonomous driving and navigation capabilities allowing service computing device to move from one location to another location without user intervention.

In one embodiment, service computing device 510 includes a clock 514, which provides date and time information to computing device 510.

In one embodiment, service computing device 510 does not include all the modules. In one embodiment, computing device 510 does not have network module 513, locomotive module 512, or clock 514.

Returning to FIG. 1, service rendering vehicle 601 is a service computing device 510. In one embodiment, controller 310 includes a computing device housed in service computing device 510. In one embodiment, service rendering vehicle 601 is a small vehicle deployed in a building to service facilities within the building. In one embodiment, service rending vehicle 601 is deployed in a shopping mall or shopping area to service stores and shops, such as to lock doors, to electrically charge digital locks, to download security surveillance camera images and videos, to change security locks, to replace batteries, to check whether stores are being occupied using infrared sensors, to detect smoke or fire, to survey pressure, temperature or humidity. In one embodiment, service rendering vehicle 601 can be deployed under water to service valves and other underwater facilities. In one embodiment, service rendering vehicle 601 can be deployed to service facilities along a pole, a tall wall or a building structure.

In one embodiment, arm 333 is a mechanical arm. In one embodiment, arm 333 is a programmable mechanical arm that can be programmed to move to service point position 383.

In one embodiment, materials 330 includes a data storage used to service the service object 360. The data storage may store data and a plurality of programming instructions. In one embodiment, materials 330 include a hardware storage to house one or more containers or trays. In one embodiment, materials 330 includes one or more packages of fluid, fuel, battery cells, or other physical materials for servicing service object 360.

In one embodiment, service label 350 is a physical label which may include a code such as a bar code, a QR code, a 2-dimensional bar code, a 3-dimensional bar code, a pattern, a colored pattern, a black-and-white pattern, a colored blob, a sequence of one or more characters, a product code, a serial number, or a textual description, or an image recognizable by controller 310. In one embodiment, service label 350 includes a display, connected to a computing device, which may be a color display or an e-paper display. The display displays a label which may include a bar code, a QR code, a 2-dimensional bar code, a 3-dimensional bar code, a pattern, a colored pattern, a black-and-white pattern, a colored blob, a sequence of one or more characters, a product code, a serial number, or a textual description, or an image recognizable by controller 310.

In one embodiment, service label 350 includes a code indicating a label physical dimension 351 of service label 350, indicating a real-world size of service label 350. In one embodiment, label physical dimension 351 includes one or more of a length, a height, a width, a diagonal length of service label 350. For example, label physical dimension 351 indicates a length of 1 inch, 18 inches, 1.2 cm, 200 cm or 20 mm, a dimension of 1-inch×0.75 inch, 15 inches×8 inches, 2 cm×1.5 cm, or a diagonal length of 5 inches or 40 inches. In one embodiment, controller 310 uses service label 350 code to obtain label physical dimension 351 by querying another computing device, such as a network computer over a data network. In one embodiment, controller 310 obtains label physical dimension 351 through matching the service label 350 code to a label physical dimension 351 stored in a table in a storage module connected to controller 310. In one embodiment, service label 350 code may include a serial number, a product code, product or service identity a bar code, a QR-code, a piece of text, a string of alpha numeric characters, a pixel pattern or a printed code, a serial number, or a part number. For example, label physical dimension 351 includes an alpha numeric string that includes "dimension: 2-inch-wide", "2 cm×2 cm", "1.2 cm×2.5 cm", "D:mm: 3:4" to indicate the dimension is 3 mm×4 mm, or "diagonal 3 in" to indicate a diagonal dimension of 3 inches.

In one embodiment, service object 360 includes a physical object such as a key lock, a digital lock, a sensor, a camera, a container, a hand sanitizer bottle, a pill dispenser, a valve, a thermostat, a smoke detector, a tray, a food tray, a basket, a bin, a door, an electric appliance, a computing device, an electronic gadget, a robot, an autonomous vehicle, or a serviceable object typically found in a store, a restaurant, a resident, a building, a hospital, a commercial building, a warehouse, an apartment, a business park, a water pool, or a campus.

In one embodiment, service point 361 corresponds to a location of a service object 360 component to be serviced. In one embodiment, service point 361 includes an antenna, a physical connector, a networking connector, an electric charging input connector, an electric charging pad, a servicing pad, a slide holding a container, a fill hole, a turn wheel, a latch, a wireless service point or a physical service point for service object 360.

Figure 3:
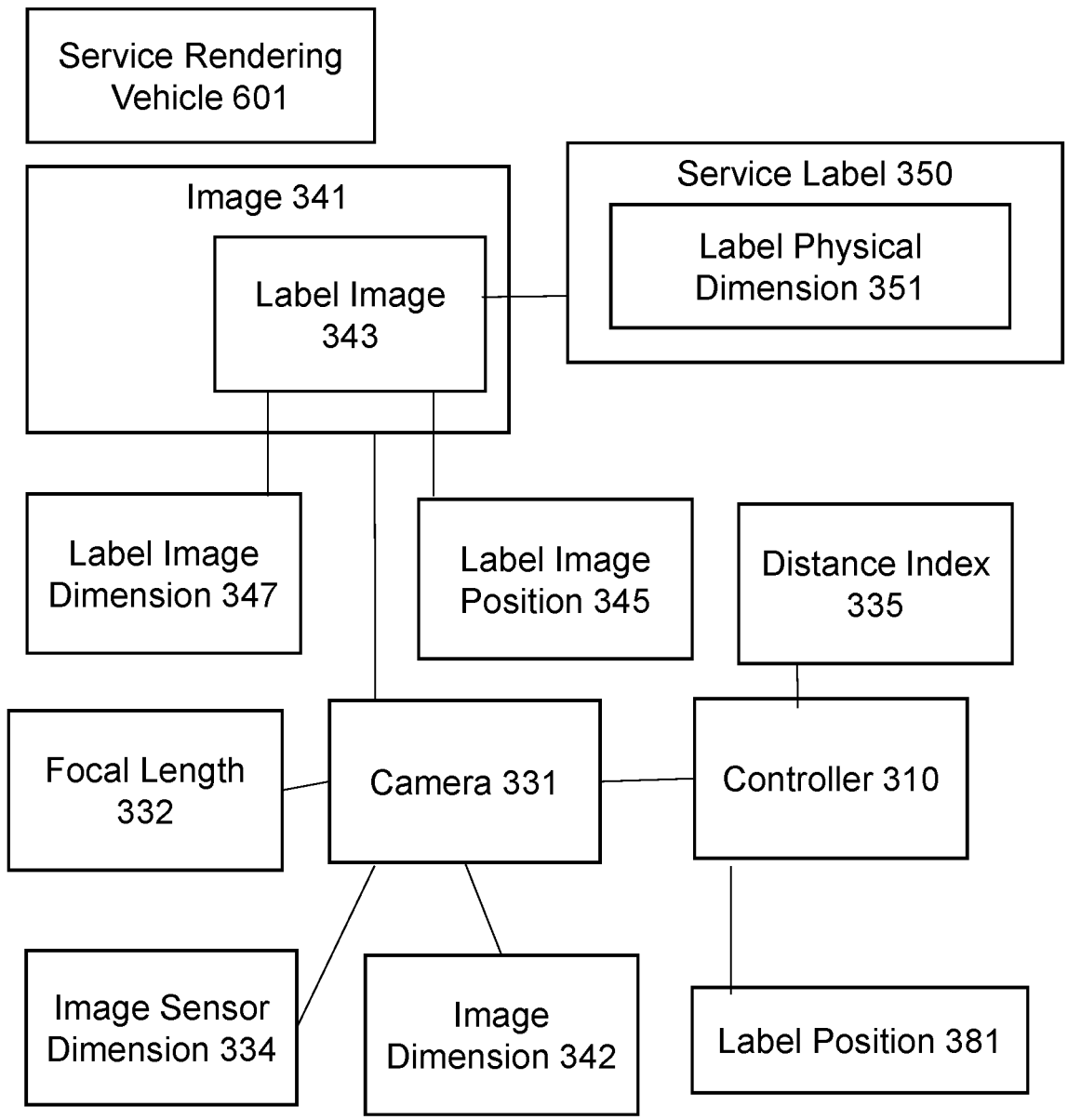
FIG. 3 illustrates an exemplary embodiment of a process to calculate a position of a service label from a service rendering vehicle.

FIG. 3 illustrates an exemplary embodiment of a process to calculate a position of a service label from a service rendering vehicle. In one embodiment, camera 331 captures image 341 which includes label image 343. In one embodiment, controller 310 instructs camera 331 to capture image 341. In one embodiment, controller 310 obtains image 341 from camera 331. Controller 310 examines image 341 and identifies the label image 343 shown in image 341 as a service label 350. In one embodiment, controller 310 determines that the label image 343 includes one or more of a QR code, a bar code, a piece of text, a color code, and a colored shape. The controller 310 identifies the label image 343 as a service label 350 by determining that the code, shape or text indicates a service label 350. In one embodiment, the code, text or colored shape of service label 350 includes a service request 357, a service point location 353, and/or a label physical dimension 351 which specifies a physical size or dimension of service label 350 (see also FIG. 1). Label physical dimension 351 may be 1 inch by 1 inch, 3 cm by 5 cm, 1 cm by 7 cm, 10 inches by 8 inches, or a physical dimension measured by units of length in width and height. In one embodiment, label physical dimension 351 includes a dimension identity which controller 310 uses to look up a physical dimension using the dimension identity and a pre-stored dimension table, or using the dimension identity to query a network computer over a data network.

In one embodiment, controller 310 calculates the label image dimension 347 of label image 343. In one embodiment, label image dimension 347 may be 120 pixels by 120 pixels, 100 pixels by 500 pixels, 50 pixels by 50 pixels, 1000 pixels by 1000 pixels, or the width and height measured with the image length as one unit. In one embodiment, controller 310 calculates a label image position 345 of label image 343 within image 341. In one embodiment, label image position 345 is calculated as an image position from the center of image 341, top left corner of image 341, bottom right corner of image 341 or any reference point in image 341.

In one embodiment, controller 310 determines an image dimension 342 of image 341. Image dimension 342 may be 3000 pixels by 4000 pixels, 4500 pixels by 4500 pixels, 2000 pixels by 8000 pixels or any image dimension according to a property of camera 331. In one embodiment, controller 310 obtains image dimension 342 from an attribute of camera 331. In one embodiment, controller 310 specifies image dimension 342 when controller 310 instructs camera 331 to capture image 341.

In one embodiment, camera 331 is associated with a focal length 332 attribute corresponding to one or more optical lens of camera 331, and with an image sensor dimension 334 attribute corresponding to an area of an image sensor of camera 331. In one embodiment, focal length 332 may be 35 mm, 29.7 mm, 26 mm, or a focal length value published by the manufacture of camera 331. In one embodiment, image sensor dimension 334 may be 17 mm^2 in 4:3 mode, 4.2 mm×5.6 mm, or a value published by the manufacture of camera 331. In one embodiment, image sensor dimension 334 is calculated by controller 310 using a pixel size attribute of camera 331. In one embodiment, controller 310 obtains or calculates focal length 332, image sensor dimension 334 and image dimension 342 based on stored camera 331 attributes. In one embodiment, controller 310 calculates distance index 335 using focal length 332, image dimension 342 and image sensor dimension 334 using the following equation (1)

$$A = B*(C/D) \quad (1)$$

where,
A=distance index 335
B=image dimension 342
C=focal length 332
D=image sensor dimension 334.

In one embodiment, controller 310 uses the width dimensions of image dimension 342 and image sensor dimension 334 to calculate distance index 335. In one embodiment, controller 310 uses the height dimensions of image dimension 342 and image sensor dimension 334 to calculate distance index 335.

In one embodiment, distance index 335 is an attribute of camera 331 and controller 310 obtains distance index 334 from a camera 331 attribute record.

In one embodiment, controller 310 calculates label position 381 based on label physical dimension 351, distance index 335 and label image position 345. Controller 310 calculates label position 381 distance as a distance away from the location of camera 331 or from the location of the service rendering vehicle 601 using equation (2), where controller 310 may use the widths of label image dimension 347 and label physical dimension 351, or the heights of label image dimension 347 and label physical dimension 351.

$$Ed = A*(F/G) \quad (2)$$

where,
Ed=label position 381 distance
A=distance index 335
F=label physical dimension 351
G=label image dimension 347.

Controller 310 calculates label position 381 x-position relative to an x-position of the camera 331 location or from service rendering vehicle 601 location using equation (3)

$$Ex = Hx*(Fw/Gw) \quad (3)$$

where,
Ex=label position 381 x-position
Hx=label image position 345 x-position
Fw=label physical dimension 351 width
Gw=label image dimension 347 width Controller 310 calculates label position 381 y-position relative to y-position of camera 331 location or from service rendering vehicle 601 location using equation (4)

$$Ey = Hy*(Fh/Gh) \quad (4)$$

where,
Ey=label position 381 y-position
Hy=label image position 345 y-position
Fh=label physical dimension 351 height
Gh=label image dimension 347 height In one embodiment, label position 381 is calculated to be a coordinate (Ex, Ey, Ed) according to equations (2)-(4), where service label 350 is of Ex in horizontal distance, Ey in vertical distance and Ed in a depth relative to a camera 331 location or service rending vehicle 601 location.

Figure 4:
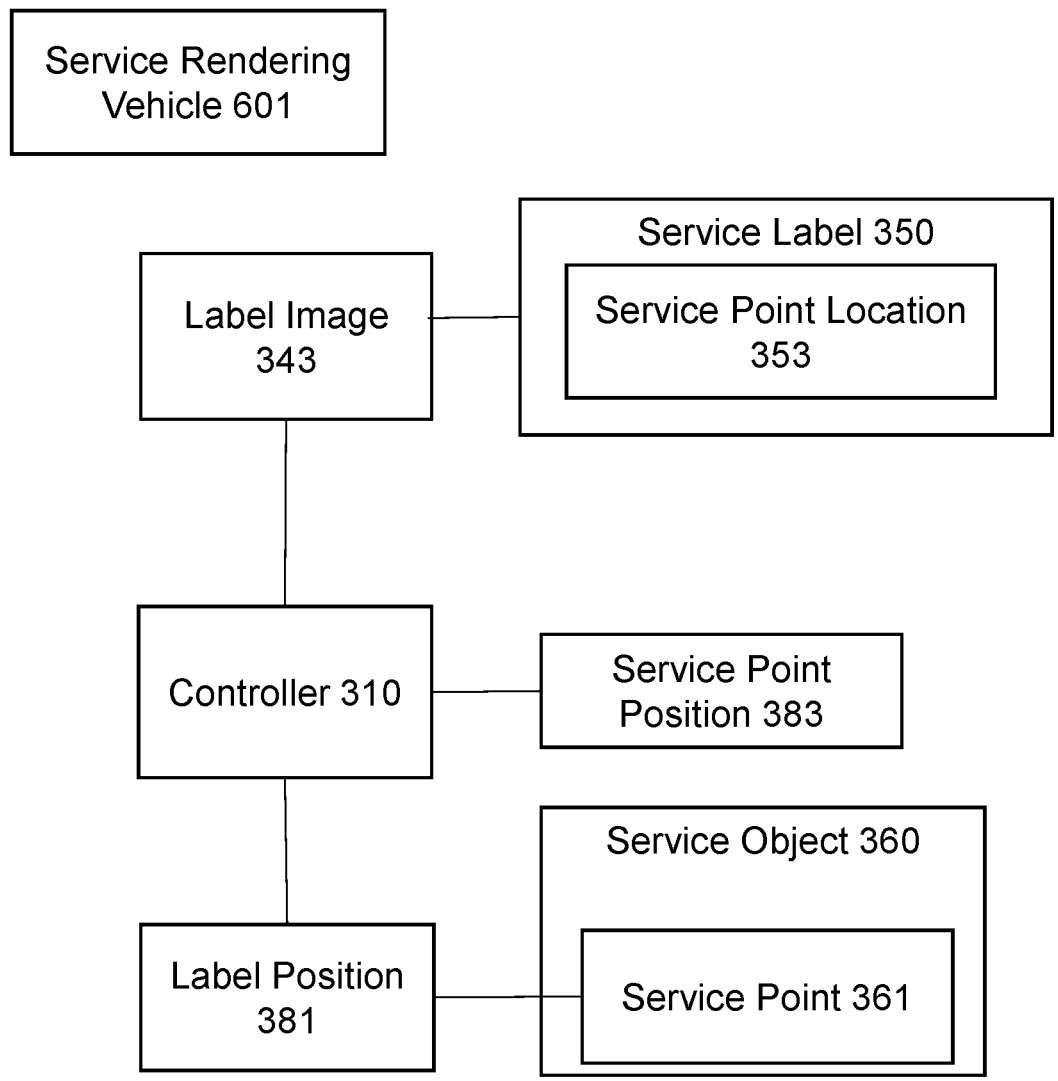
FIG. 4 illustrates an exemplary embodiment of a process to calculate a position of a service point from a service rendering vehicle.

FIG. 4 illustrates an exemplary embodiment of a process to calculate a position of a service point from a service rendering vehicle. In one embodiment, controller 310 processes label image 343 for service label 350 to further obtain a service point location 353. In one embodiment, service label 350 includes a code or a piece of text indicating service point location 353. In one embodiment, service point location 353 includes a coordinate of length units showing a x-dimension, a y-dimension and a depth, where the coordinate indicates the location of service point 361 relative to the location of the service label 350. In one embodiment, service point location 353 includes a coordinate (10 inches, −8 inches, 0 inches) indicating service point 361 is 10 inches on the right of, 8 inches below and same depth as service label 350. In one embodiment, service point location 353 includes a coordinate (−4 inches, 3 inches, 1 inch) indicating service point 361 is 4 inches on the left of, 3 inches above and 1 inch deep from service label 360. In one embodiment, controller 310 identifies the service point location 353 from label image 343 and extracts the coordinate from the service point location 353. Controller 310 calculates a service point position 383 using service point location 353 and a label position 381 calculated as described above with reference to FIG. 3. In one embodiment, service point position 383 includes a coordinate (Fx, Fy, Fd) where Fx is a service point position 383 x-position, Fy is a service point position 383 y-position and Fd is a service point position 383 distance. Service point position 383 is calculated to be a position relative to the position of the service rendering vehicle 601.

In one embodiment, service point location 353 includes a coordinate (SPLx, SPLy, SPLd) indicating a x-position SPLx, a y-position SPLy, a d-depth SPLd of service point 361 of service object 360 from service label 350. (Fx, Fy, Fd) of service point position 383 is calculated using the following equations:

$$Fx = Ex + SPLx \quad (5)$$

$$Fy = Ey + SPLy \quad (6)$$

$$Fd = Ed + SPLd \quad (7)$$

where (Ex, Ey, Ed) is a coordinate corresponding to label position 381, described above with reference to FIG. 3. Thus service point position 383 coordinate (Fx, Fy, Fd) represents a position relative to the position of the service rendering vehicle 601. More specifically, the coordinate (Fx, Fy, Fd) represents a position relative to the position of the controller 310, the arm 333, the camera 331, or some other component of the service rendering vehicle 601.

Figure 5:
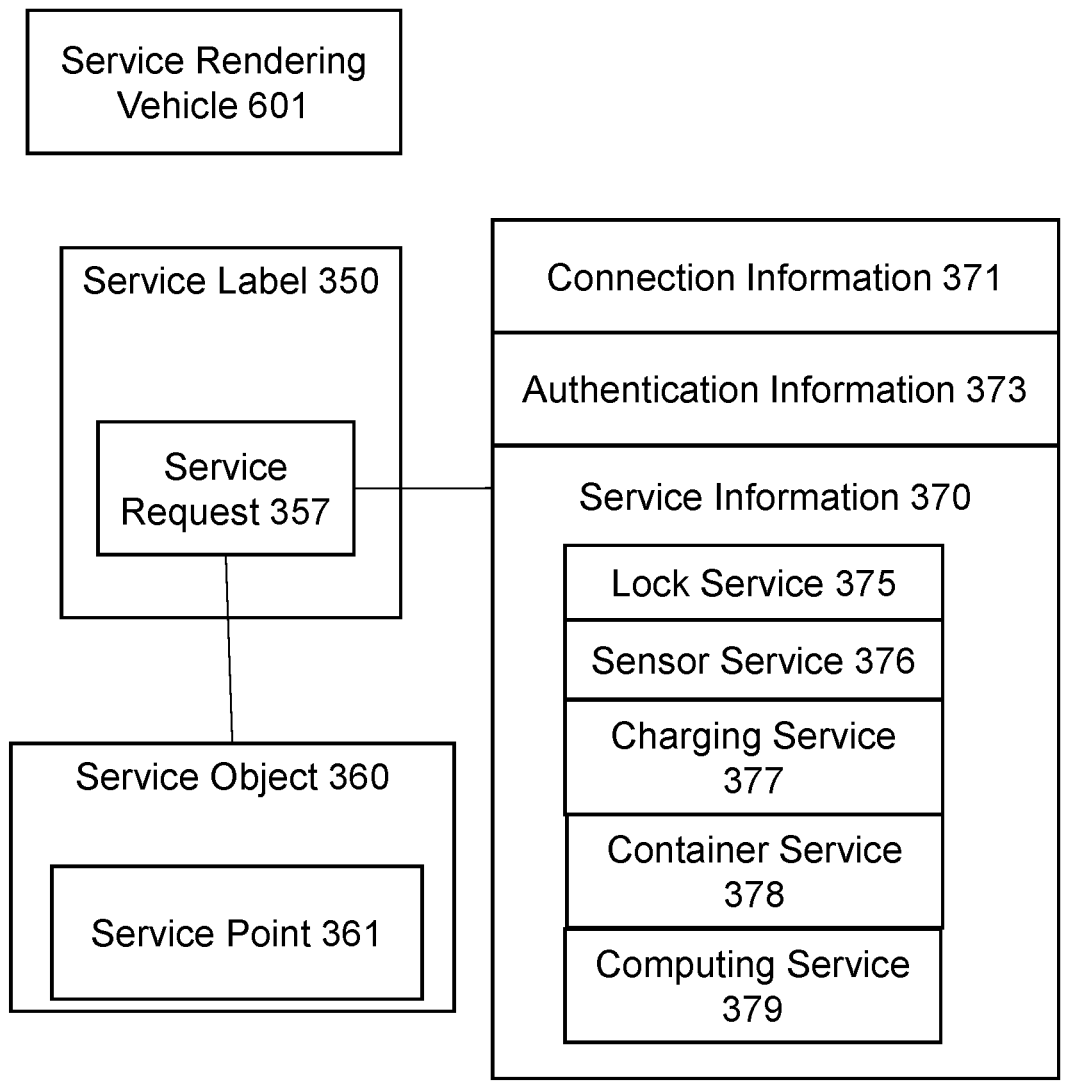
FIG. 5 illustrates an exemplary embodiment of a service request.

FIG. 5 illustrates an exemplary embodiment of a service request. In one embodiment, service label 350 includes a code for a service request 357. Service request 357 includes one or more pieces of information such as connection information 371, authentication information 373, and service information 370. The service information 370 may include one or more of the following: lock service 375; sensor service 376; charging service 377; container service 378; and computing service 379. In one embodiment, connection information 371 includes information about a connection to be established with the service object 360 at service point 361. In one embodiment, connection information 371 provides information allowing service rendering vehicle 601 to establish a data connection with service object 360. In one embodiment, connection information 371 includes wireless connection information such as use of radio frequency (RF), LiFi, WiFi, 802.11, NFC, 802.15, Personal Area Network (PAN), Bluetooth, SSID, wireless identity, password, passcode, security key, link-layer protocol, signal proximity radius, or a channel number or frequency. In one embodiment, connection information 371 includes physical connection information such as use of Ethernet, serial port, USB connection, or other physical connector information, link-layer protocol, link-layer attributes such as VLAN, security key, passcode or other physical connection information.

In one embodiment, authentication information 373 provides an indication of whether authentication of the service rendering vehicle 601 is necessary to access service object 360, and if so, further includes information for the authentication process. In one embodiment, authentication information 373 includes a method of authentication, an authentication challenge, a question, or a request for an identity, security key, or a password.

In one embodiment, lock service 375 indicates service object 360 includes a lock and an operation service request to operate on the lock. In one embodiment, service object 360 includes a digital lock, a physical lock, an eye-scanner lock, a remote controlled lock, or any lock that can be operated by service rendering vehicle 601. In one embodiment, lock service 375 includes a locking operation, an unlocking operation, a lock configuration operation, a lock access event log transfer operation, or other lock operational service. In one embodiment, lock service 375 includes one or more instructions to perform the requested lock operation.

In one embodiment, sensor service 376 indicates service object 360 includes a sensor and an operation service request to operate on the sensor. In one embodiment, sensor service 376 includes an operation request to activate, de-activate, calibrate, adjust, or configure the sensor of service object 360. In one embodiment, sensor service 376 includes instructions to connect to the sensor of service object 360 at service point 361. In one embodiment, the sensor is a remote controlled sensor, and sensor service 376 includes wireless connection instructions, which may be described in connection information 371. In one embodiment, service object 360 includes a data storage for storing data captured by the sensor. Sensor service 376 includes a data transfer request to transfer the captured data to service rendering vehicle 601. In one embodiment, sensor service 376 includes a data transfer request to transfer data from service rendering vehicle 601 to the sensor of service object 360.

In one embodiment, service object 360 includes an electronic device, and charging service 377 includes a service request to electrically charge the electronic device via service point 361. In one embodiment, service point 361 includes an electric charging input and charging service 377 includes a description of the electric charging input. In one embodiment, service point 361 includes a wireless electric charging area and charging service 377 describes the wireless charging requirement. In one embodiment, service object 360 includes a field replaceable or swappable battery cell located at service point 361, and charging service 377 describes the battery cell.

In one embodiment, container service 378 indicates service object 360 includes a physical container. Container service 378 includes a service request to service the container. In one embodiment, container service 378 includes an operation service to empty the container, to fill the container with material, to remove the container and put it into service rendering vehicle 601, to place a container from service rendering vehicle 601 onto service point 361, to swap out the container with another container in service rendering vehicle 601, or to place an item from service rendering vehicle 601 onto the container.

In one embodiment, service request 357 includes a computing service 379. In one embodiment, computing service 379 describes a computing programming service and includes one or more computing programming instructions to be executed by service rendering vehicle 601. In one embodiment, computing service 379 includes a detailed description of service object 360, service point 361, and one or more instructions to service the service object 360.

Figure 6:
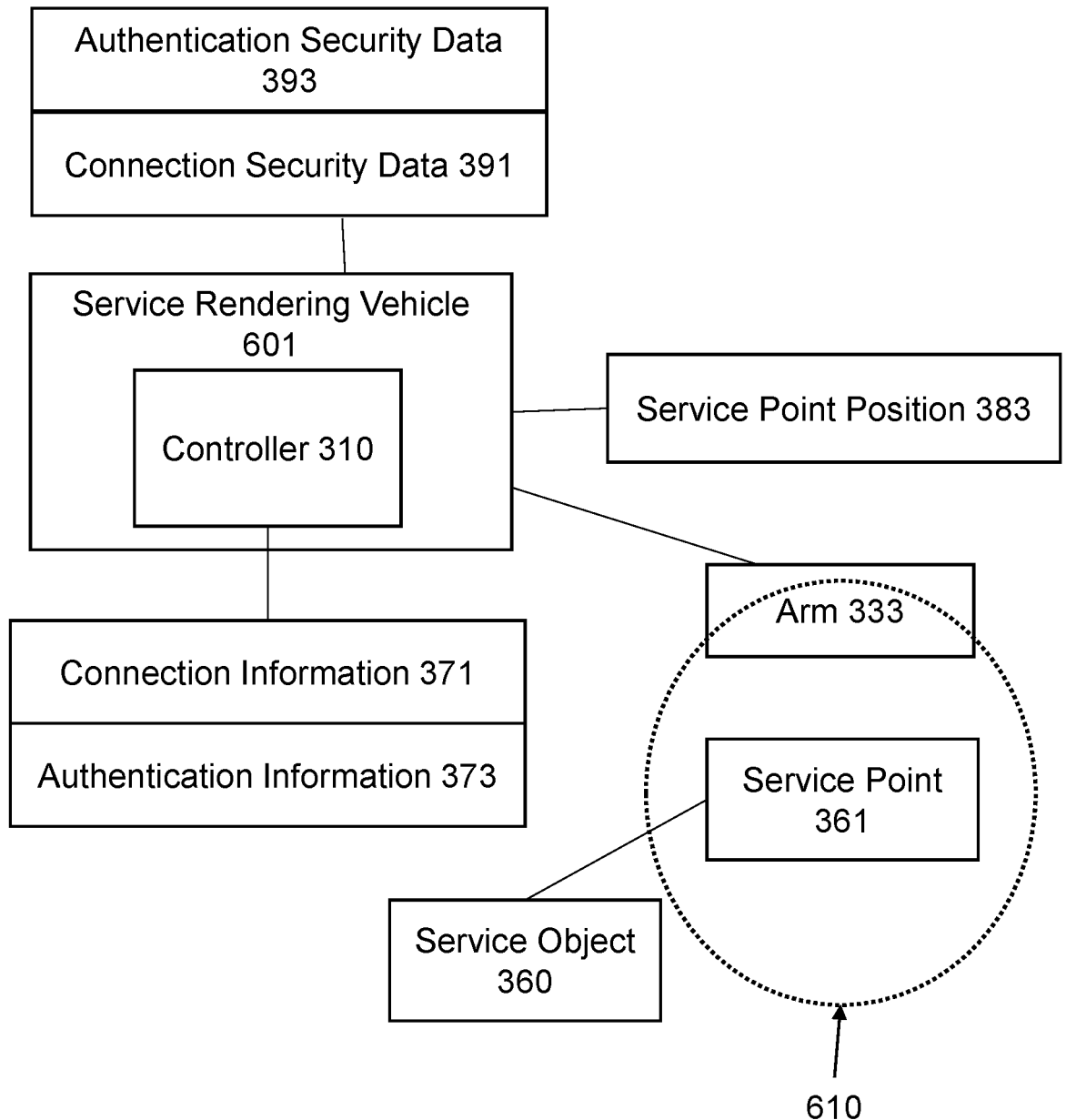
FIG. 6 illustrates an exemplary embodiment of an authentication process implemented at a service point.

FIG. 6 illustrates an exemplary embodiment of an authentication process at a service point. In one embodiment, controller 310 processes service point position 383, as described above with reference to FIG. 4, and issues instructions to service rendering vehicle 601 to move to service point 361. In one embodiment, controller 310 instructs service rendering vehicle 601 to move arm 333 to service point 361. In one embodiment, service rendering vehicle 601 moves towards service point 361 according to service point position 383. When service rendering vehicle 601 determines it is close to service point 361, service rendering vehicle 601 moves arm 333 to service point 361.

In one embodiment, controller 310 processes connection information 371 to connect to service object 360 via service point 361. In one embodiment, connection information 371 indicates a wireless connection and a proximity distance from which a wireless connection can be made. Controller 310 instructs service rendering vehicle 601 to move within the proximity distance 610 of the service point 361. In one embodiment, service rendering vehicle 601 moves itself or the arm 333 within the area, where the proximity distance 610 is defined as a radius around service point 361. The service rendering vehicle 601 informs controller 310 when it has arrived within the proximity distance 610. Upon being informed that service rendering vehicle 601 is within the proximity distance 610, controller 310 connects to service object 360 using the wireless connection information 371. In one embodiment, controller 310 obtains connection security data 391, pre-stored in controller 310 or service rendering vehicle 601, and uses connection security data 391 to connect to service object 360. In one embodiment, connection security data 391 includes a security key, a passcode, a pin code, an answer to a question, or an authorized code. In one embodiment, controller 310 obtains connection security data 391 from a network computer. Controller 310 may use connection information 371 to obtain connection security data 391 from the network computer.

In one embodiment, connection information 371 indicates a physical connection. Controller 310 instructs service rendering vehicle 601 to move arm 333 to service point 361 and to connect or attach arm 333 directly onto service point 361. Upon knowing the attachment is completed from service rendering vehicle 601, controller 310 issues commands or signals via the physical connection at service point 361, in order to connect to service object 360. In one embodiment, controller 310 issues the commands and signals according to connection information 371 and obtained connection security data 391.

In one embodiment, upon established a connection to service object 360, controller 310 processes authentication information 373 to perform an authentication process with the service object 360. In one embodiment, controller 310 retrieves authentication security data 393, either obtained from a network computing device or pre-stored in controller 310 or service rendering vehicle 601. Controller 310 uses authentication security data 393 to respond to one or more authentication query from service object 360.

In one embodiment, controller 310 determines it is authenticated by service object 360. Controller 310 proceeds to service the service object 360.

Figure 7:
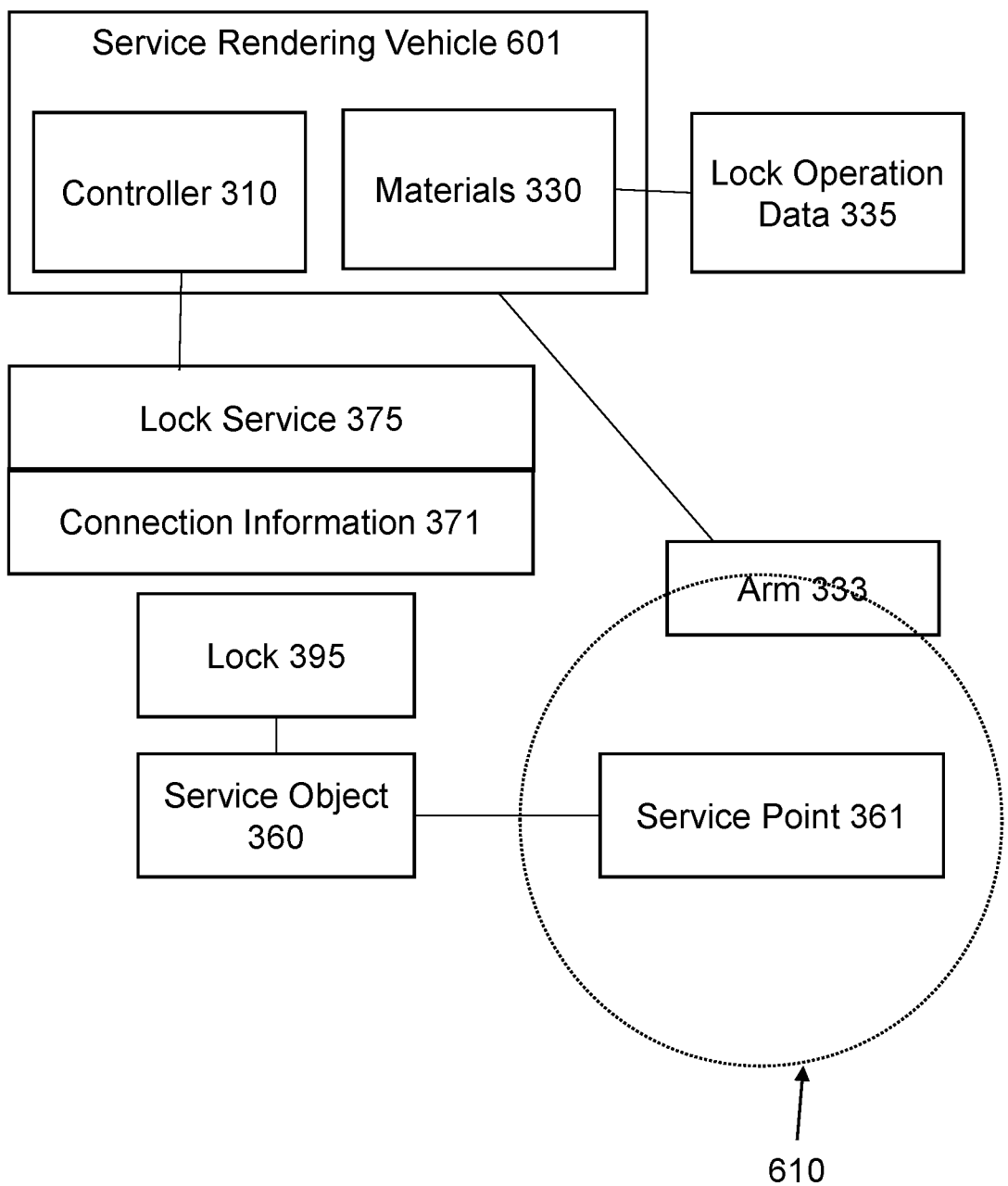
FIG. 7 illustrates an exemplary embodiment of a process to render a service to a lock.

FIG. 7 illustrates an exemplary embodiment process to render a service to a lock. In one embodiment, controller 310 processes lock service 375 which indicates service object 360 includes a lock 395. In one embodiment, lock service 375 indicates lock 395 is a wireless remote controlled lock. Lock service 375 may include wireless connection information of lock 395 or a reference to connection information 371 for a wireless connection to lock 395. The controller 310 instructs the service rendering vehicle 601 to move within the proximity distance 610. Upon being informed that the service rendering vehicle 601 have moved within the proximity distance 610, the controller 310 establishes a wireless connection to lock 395 according to the wireless connection information of lock 395 or connection information 371.

In one embodiment, lock 395 is a key lock, requiring a physical connection at service point 361 in order to be operated. Lock service 375 includes the physical connection information or a reference to connection information 371 for the physical connection information to attach at service point 361. Controller 310 instructs service rendering vehicle 601 to attach physically at service point 361.

In one embodiment, lock service 375 includes a lock operation. Controller 310 retrieves lock operation data 335 from materials 330 corresponding to the lock operation included in lock service 375. In one embodiment, lock service 375 includes a brand name, a manufacturer identity, a make, a model number, a serial number or an identity of lock 395. Controller 310 uses lock service 375 to retrieve lock operation data 335, which may include a data connection protocol, a piece of security data or key code to operate lock 395, an operation sequence or instructions, corresponding to the brand, manufacturer, make, model number, serial number or lock identity. In one embodiment, lock service 375 includes one or more lock operations such as to activate, de-activate, lock, unlock, arm, disarm, configure a key code, reset. Lock operation data 335 includes instructions and key-code for the lock service 375. In one embodiment, lock operation data 335 includes instructions to turn arm 333, to issue data signals, to generate electronic pulses, or other mechanical, data communication, or electronic instructions. In one embodiment, lock operation data 335 includes a key code to lock, unlock, activate, de-activate, arm or disarm lock 395.

In one embodiment, lock 395 includes a data store storing data used or captured by lock 395. The captured data may include event log entries, usage data, configuration data, networking data, key code, security data, or other data relevant to lock 395. In one embodiment, lock service 375 includes a data transfer operation to upload lock 395 data or to download lock 395 data. Controller 310 processes lock service 375 and transfers lock 395 to store into lock operation data 335, or sends lock operation data 335 to lock 395 to be stored, according to lock service 375.

Figure 8:
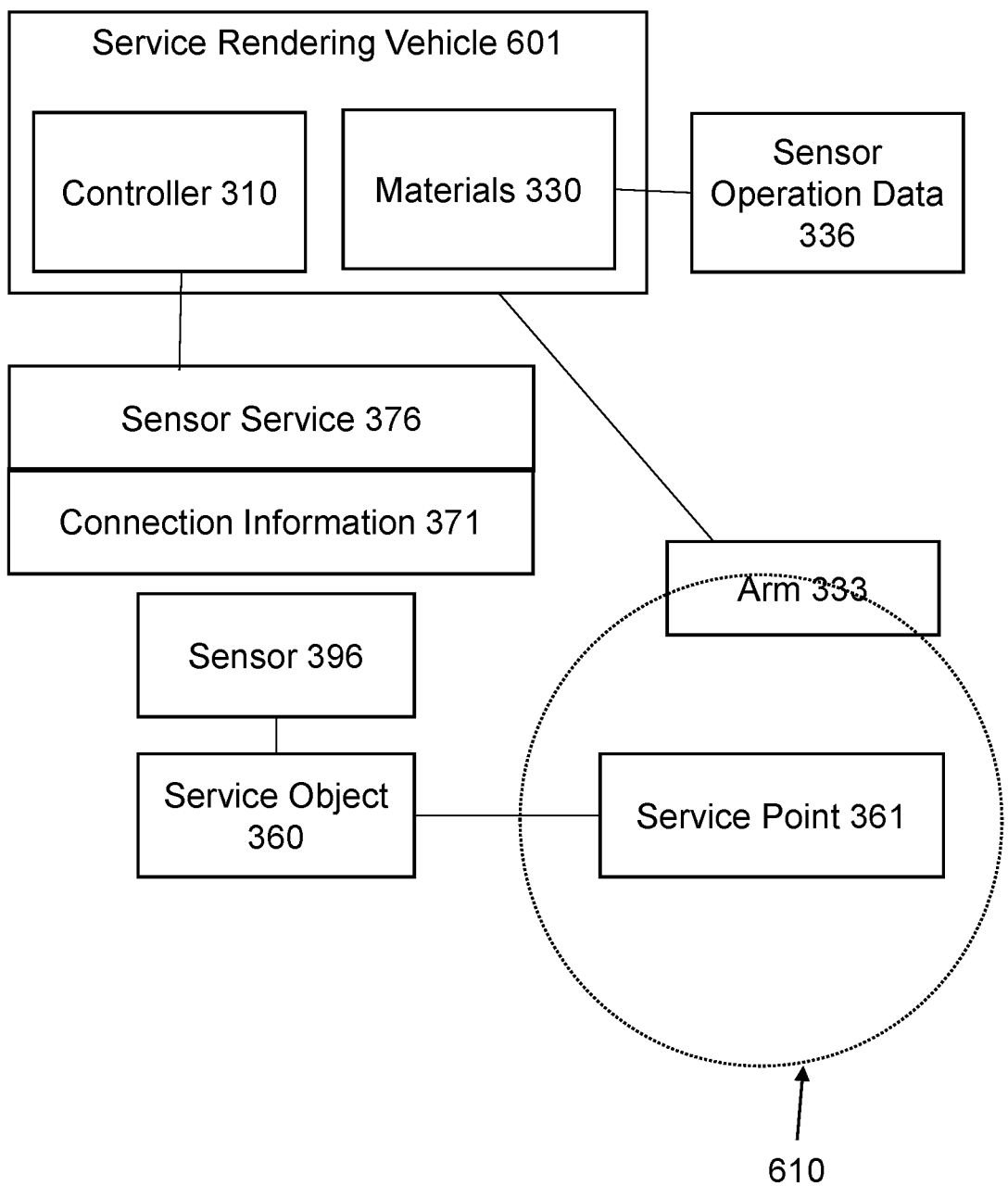
FIG. 8 illustrates an exemplary embodiment of a process to render a service to a sensor.

FIG. 8 illustrates an exemplary embodiment of a process to render a service to a sensor. In one embodiment, controller 310 processes sensor service 376 which indicates service object 360 includes a sensor 396. In one embodiment, sensor service 376 indicates sensor 396 is wirelessly controlled. Sensor service 376 may include wireless connection information of sensor 396 or a reference to connection information 371 for a wireless connection to sensor 396. The controller 310 instructs the service rendering vehicle 601 to move within the proximity distance 610. Upon being informed that the service rendering vehicle 601 have moved within the proximity distance 610, the controller 310 establishes a wireless connection to sensor 396 according to the wireless connection information of sensor 396 or connection information 371.

In one embodiment, sensor 396 requires a physical connection at service point 361 in order to be operated. Sensor service 376 includes the physical connection information or a reference to connection information 371 for the physical connection information to attach at service point 361. Controller 310 instructs service rendering vehicle 601 to attach physically at service point 361.

In one embodiment, sensor service 376 includes a sensor operation. Controller 310 retrieves sensor operation data 336 from materials 330 corresponding to the sensor operation included in sensor service 376. In one embodiment, sensor service 376 includes a sensor type, a brand name, a manufacturer identity, a make, a model number, a serial number or an identity of sensor 396. Controller 310 uses sensor service 376 to select and retrieve sensor operation data 336, which may include a data connection protocol, a piece of security data or key code to operate sensor 396, and an operation sequence or instructions corresponding to the sensor type, the brand, manufacturer, make, model number, serial number or sensor identity. In one embodiment, sensor service 376 includes one or more sensor operations such as to activate, de-activate, calibrate, adjust settings, configure a key code, or reset the sensor 396. In one embodiment, sensor operation data 336 includes instructions to turn arm 333, to generate and transmit data signals, to generate electronic pulses, to establish data communication, or to transmit electronic instructions to perform the necessary requested sensor operation. In one embodiment, sensor operation data 336 includes a key code to activate, de-activate, calibrate, change settings, configure or reset the sensor 396.

In one embodiment, sensor 396 includes a data store storing data captured by sensor 396. The captured data may include event log entries, usage data, security alerts, or other data relevant to sensor 396. In one embodiment, sensor service 376 includes a data transfer operation to upload sensor 396 captured data. Controller 310 processes sensor service 376 and transfers sensor 396 captured data into sensor operation data 336.

Figure 9:
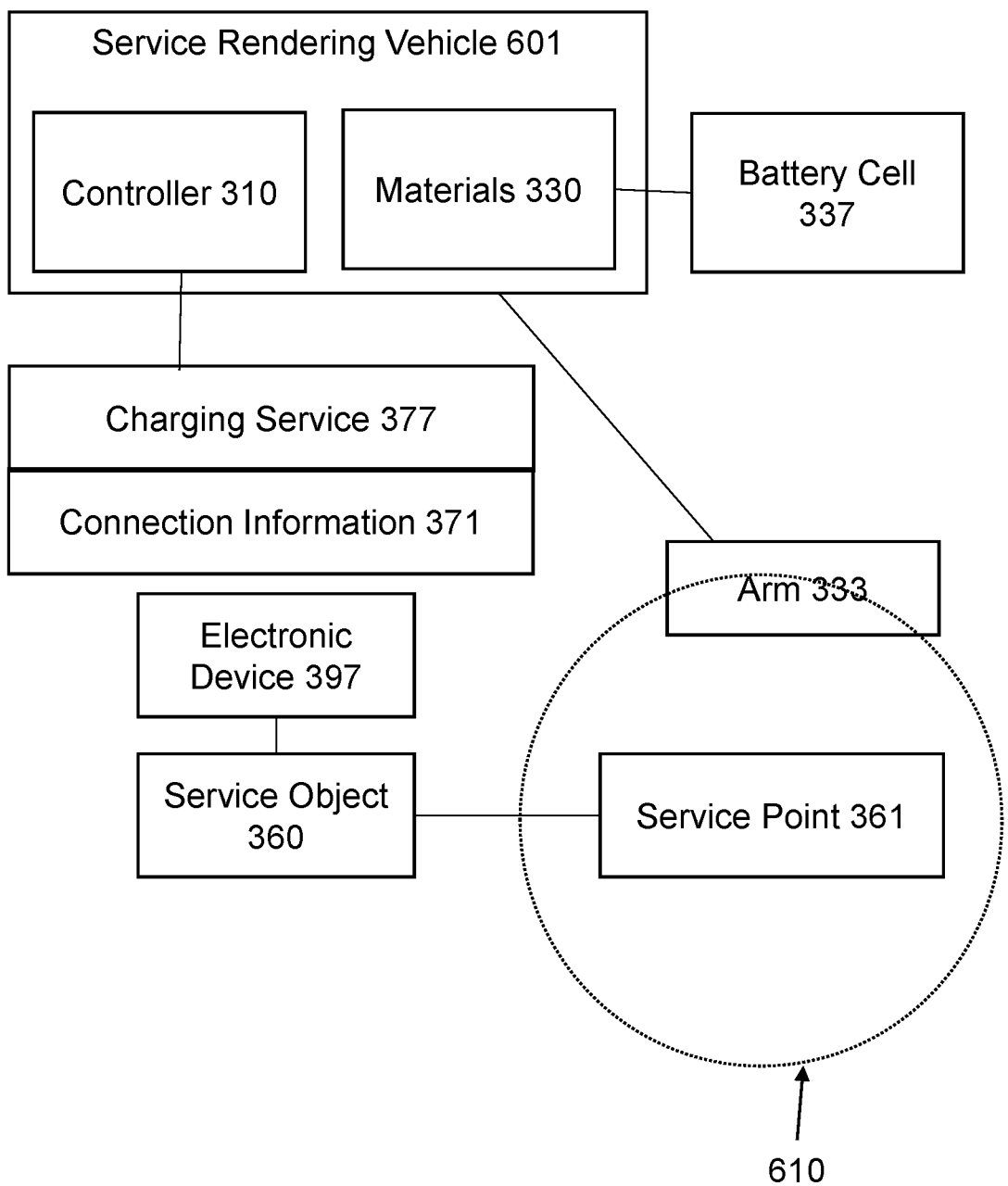
FIG. 9 illustrates an exemplary embodiment of a process to render a battery charging service.

FIG. 9 illustrates an exemplary embodiment of a process to render an electric charging service. In one embodiment, controller 310 processes charging service 377 which indicates service object 360 includes an electronic device 397. In one embodiment, charging service 377 indicates electronic device 397 is wirelessly controlled. Charging service 377 may include wireless connection information of electronic device 397 or a reference to connection information 371 for a wireless connection with the electronic device 397. The controller 310 instructs the service rendering vehicle 601 to move within the proximity distance 610. Upon being informed that the service rendering vehicle 601 have moved within the proximity distance 610, the establishes the wireless connection with the electronic device 397.

In one embodiment, electronic device 397 requires a physical connection at service point 361 in order to be operated. Charging service 377 includes the physical connection information or a reference to connection information 371 for the physical connection information to attach at service point 361. Controller 310 instructs service rendering vehicle 601 to attach physically at service point 361.

In one embodiment, charging service 377 includes an electric charging operation. In one embodiment, charging service 377 includes an electric current, a voltage, a battery type, a brand name, a manufacturer identity, a make, a model number, a serial number or an identity of electronic device 397. Controller 310 uses charging service 377 to select a battery cell 337 from materials 330 where battery cell 337 corresponds to the required electric current, the required voltage, the brand name, manufacturer, make, model, serial number or electronic device 397 identity. In one embodiment, charging service 377 includes one or more electric charging operations such as to turn on, turn off, charge, or discharge.

In one embodiment, electronic device 397 includes a data store storing data about electronic device 397. The data may include event log entries, usage data, security alerts, or other data relevant to electronic device 397. In one embodiment, charging service 377 includes a data transfer operation to upload electronic device 397 data. Controller 310 processes charging service 377 and transfers electronic device 397 data into a storage connected to controller 310.

Figure 10:
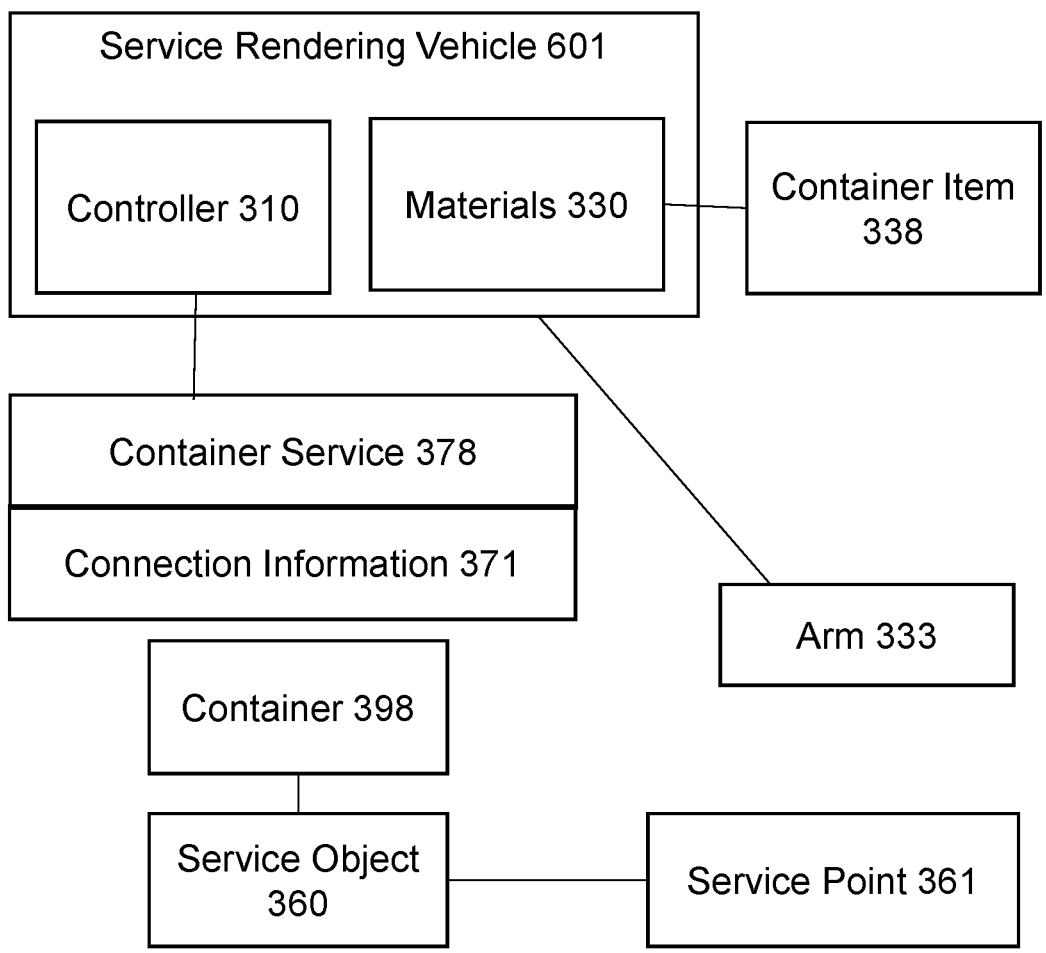
FIG. 10 illustrates an exemplary embodiment of a process to render a service to a container.

FIG. 10 illustrates an exemplary embodiment of a process to render a service to a container. In one embodiment, controller 310 processes container service 378 which indicates service object 360 includes a container 398. In one embodiment, container service 378 requires a physical connection at service point 361 in order to be operated. Container service 378 includes the physical connection information or a reference to connection information 371 for the physical connection information to attach at service point 361. Controller 310 instructs service rendering vehicle 601 to attach physically at service point 361.

In one embodiment, container service 378 includes a container operation. In one embodiment, container service 378 includes a container type, a brand name, a manufacturer identity, a make, a model number, a serial number or an identity of container 398. Controller 310 uses container service 378 to select a container item 338 from materials 330 where container item 338 corresponds to the container type, the brand name, manufacturer, make, model, serial number or container 398 identity. In one embodiment, container service 378 includes one or more container operations such as to refill, remove, replace, place a container item, or empty container 398. Controller 310 instructs arm 333 to act according to container service 378, for example, to refill container 398 with container item 338, to remove container 398 and place container 398 to an empty slot corresponding to container item 338, to replace container 398 by container item 338, to place container item 338 onto container 398, or to empty content of container 398 onto container item 338.

In one embodiment, container 398 includes a data store storing data about container 398. The captured data may include event log entries, usage data, security alerts, or other data relevant to container 398. In one embodiment, container service 378 includes a data transfer operation to upload container 398 captured data. Controller 310 processes container service 378 and transfers container 398 captured data into a storage connected to controller 310.

Figure 11:
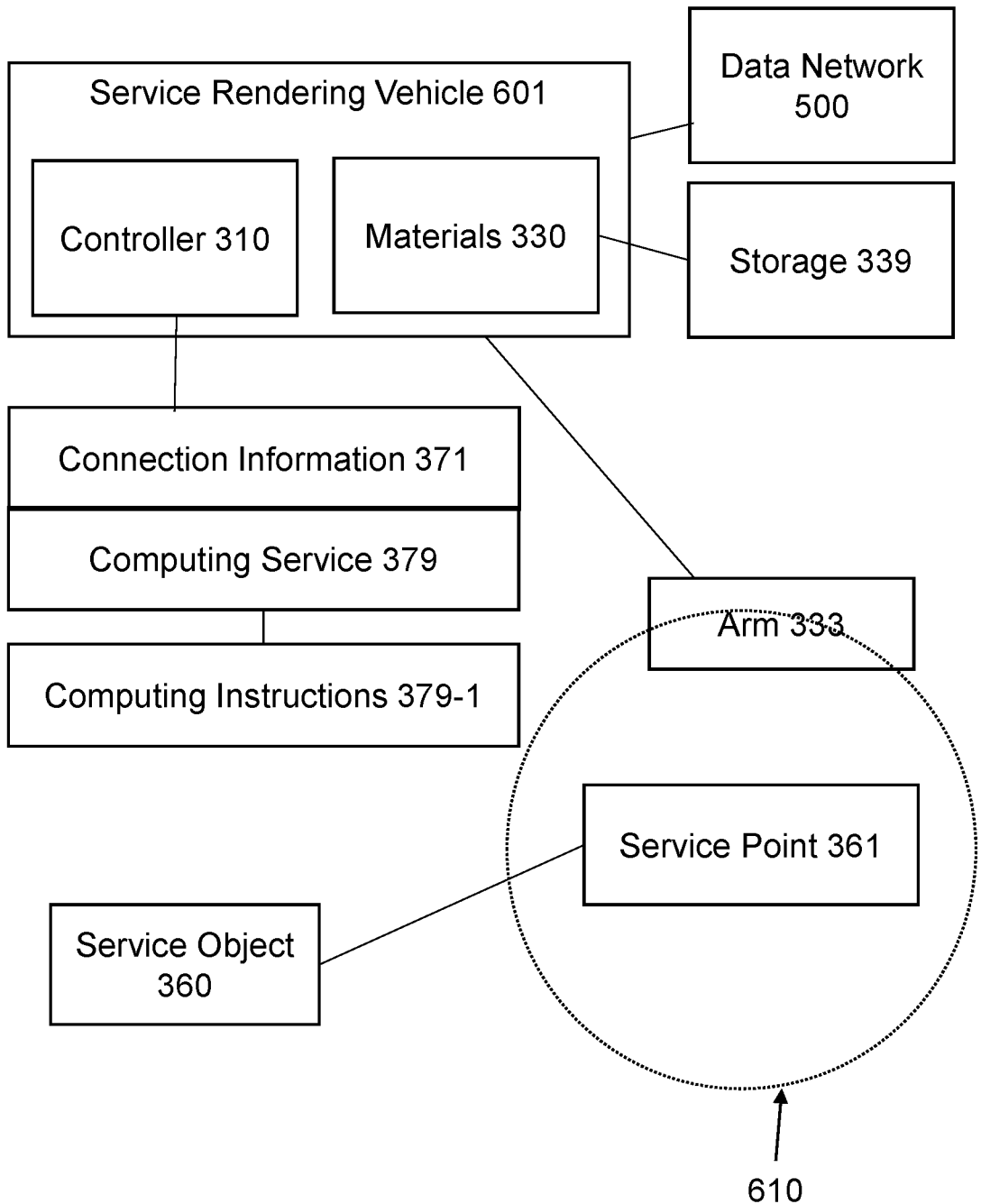
FIG. 11 illustrates an exemplary embodiment of a process to render a dynamic computing service.

FIG. 11 illustrates an exemplary embodiment process to render a dynamic computing service. In one embodiment, controller 310 processes computing service 379 which includes one or more computing instructions 379-1, and indicates service object 360 is to be serviced by applying computing instructions 379-1. In one embodiment, computing service 379 indicates service object 360 is wirelessly connected. Computing service 379 may include wireless connection information of service object 360 or a reference to connection information 371 for a wireless connection with the service object 360. The controller 310 instructs the service rendering vehicle 601 to move within the area 610. Upon being informed that the service rendering vehicle 601 have moved within the area 610, the establishes the wireless connection with the service object 360.

In one embodiment, service object 360 requires a physical connection at service point 361 in order to be operated. Computing service 379 includes the physical connection information or a reference to connection information 371 for the physical connection information to attach at service point 361. Controller 310 instructs service rendering vehicle 601 to attach physically at service point 361.

In one embodiment, upon establishing a data communication connection with service object 360, controller 310 executes computing instructions 379-1. In one embodiment, computing instructions 379-1 uses one or more computing programming languages such as scripting languages Javascript, Python, Ruby, Perl; marked-up languages such as WL, JSON, HTML5; programming languages such as Java, C, C++; application programming interfaces (API); or other computing languages. In one embodiment, controller 310 determines computing instructions 379-1 to require data, which may include other computing instructions, stored in storage 339 of materials 330. Controller 310 selects storage 339 using computing service 379 and uses storage 339 while applying computing instructions 379-1. In one embodiment, controller 310 connects to a data network 500 according to computing instructions 379-1 to establish a data connection via data network 500 to a network computing device. In one embodiment, computing instructions 379-1 includes instructions to operate arm 333 and/or service rendering vehicle 601.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer usable or computer readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for locating a service object by a service rendering system, comprising:
  (a) receiving, by a controller of the service rendering system, an image captured by a camera coupled to the controller;
  (b) processing, by the controller, the image to identify a label image in the image;
  (c) identifying, by the controller, a label in the label image as corresponding to the service object;
  (d) obtaining, by the controller, a service point location encoded in the label, wherein the service point location comprises a location relative to a location of the label;
  (e) calculating, by the controller, a label position of the label using the image of the label; and (f) calculating, by the controller, a service point position using the service point location and the label position.

2. The method of claim 1, further comprising:
(g) issuing, by the controller, instructions to move the service rendering system to the service object at the service point position.

3. The method of claim 2, wherein the service rendering system comprises a mechanical arm, wherein the issuing (g) comprises:
(g1) issuing, by the controller, the instructions to move the mechanical arm to the service object at the service point position.

4. The method of claim 1, wherein the label comprises controller readable code, the controller readable code comprising one or more of the following: a bar code; a Quick Response (QR) code; a 2-dimensional bar code; a 3-dimensional bar code; a pattern; a colored pattern; a black-and-white pattern; a colored blob; a sequence of one or more characters; a product code; and a serial number.

5. The method of 1, wherein the service rendering system comprises a mechanical arm, wherein the method further comprises:
(g) obtaining, by the controller, a service request encoded in the label; and
(h) issuing, by the controller, instructions for the mechanical arm to render a service at the service point position according to the service request.

6. The method of claim 5, wherein the issuing (h) comprises:
(h1) issuing, by the controller, the instructions for the mechanical arm to physically couple to the service object at the service point position.

7. The method of claim 6, wherein the service object comprises a lock, wherein the issuing (h1) comprises:
(h1i) issuing, by the controller, the instructions for the mechanical arm to perform a lock operation on the lock according to the service request.

8. The method of claim 6, wherein the service object comprises a physical item, wherein the issuing (h1) comprises:
(h1i) issuing, by the controller, the instructions for the mechanical arm to perform a physical item operation on the physical item according to the service request.

9. The method of claim 5, wherein the mechanical arm comprises one or more sensors, wherein the issuing (h) comprises:
(h1) issuing, by the controller, the instructions for the mechanical arm to perform a sensor operation at the service point position using the one or more sensors.

10. A non-transitory computer readable medium comprising computer readable program code embodied therein for locating a service object by a service rendering system, wherein when executed by a processor of the service rendering system, causes the processor to:
(a) receive an image captured by a camera coupled to the processor;
(b) process the image to identify a label image in the image;
(c) identify a label in the label image as corresponding to the service object;
(d) obtain a service point location encoded in the label, wherein the service point location comprises a location relative to a location of the label;
(e) calculate a label position of the label using the image of the label; and
(f) calculate a service point position using the service point location and the label position.

11. The medium of claim 10, wherein the processor is further caused to:
(g) issue instructions to move the service rendering system to the service object at the service point position.

12. The medium of claim 11, wherein the service rendering system comprises a mechanical arm, wherein the issue (g) comprises:
(g1) issue the instructions to move the mechanical arm to the service object at the service point position.

13. The medium of claim 10, wherein the label comprises processor readable code, the processor readable code comprising one or more of the following: a bar code; a Quick Response (QR) code; a 2-dimensional bar code; a 3-dimensional bar code; a pattern; a colored pattern; a black-and-white pattern; a colored blob; a sequence of one or more characters; a product code; and a serial number.

14. The medium of 10, wherein the service rendering system comprises a mechanical arm, wherein the processor is further caused to:
(g) obtain a service request encoded in the label; and
(h) issue instructions for the mechanical arm to render a service at the service point position according to the service request.

15. The medium of claim 14, wherein the issue (h) comprises:
(h1) issue the instructions for the mechanical arm to physically couple to the service object at the service point position.

16. The medium of claim 15, wherein the service object comprises a lock, wherein the issue (h1) comprises:
(h1) issue the instructions for the mechanical arm to perform a lock operation on the lock according to the service request.

17. The medium of claim 15, wherein the service object comprises a physical item, wherein the issue (h1) comprises:
(h1) issue the instructions for the mechanical arm to perform a physical item operation on the physical item according to the service request.

18. The medium of claim 14, wherein the mechanical arm comprises one or more sensors, wherein the issue (h) comprises:
(h1) issue the instructions for the mechanical arm to perform a sensor operation at the service point position using the one or more sensors.

19. A service rendering system, comprising:
a controller;
a camera coupled to the controller; and
a non-transitory computer readable medium comprising computer readable program code embodied therein for locating a service object, wherein when executed by the controller, causes the controller to:
(a) receive an image captured by the camera;
(b) process the image to identify a label image in the image;
(c) identify a label in the label image as corresponding to the service object;
(d) obtain a service point location encoded in the label, wherein the service point location comprises a location relative to a location of the label;
(e) calculate a label position of the label using the image of the label; and
(f) calculate a service point position using the service point location and the label position.

20. The system of claim 19, wherein the controller is further caused to:
(g) issue instructions to move the service rendering system to the service object at the service point position.

21. The system of claim 20, wherein the service rendering system further comprises a mechanical arm, wherein the issue (g) comprises:
   (g1) issue the instructions to move the mechanical arm to the service object at the service point position.

22. The system of claim 19, wherein the label comprises controller readable code, the controller readable code comprising one or more of the following: a bar code; a Quick Response (QR) code; a 2-dimensional bar code; a 3-dimensional bar code; a pattern; a colored pattern; a black-and-white pattern; a colored blob; a sequence of one or more characters; a product code; and a serial number.

23. The system of 19, wherein the service rendering system further comprises a mechanical arm, wherein the controller is further caused to:
   (g) obtain a service request encoded in the label; and
   (h) issue instructions for the mechanical arm to render a service at the service point position according to the service request.

24. The system of claim 23, wherein the issue (h) comprises:
   (h1) issue the instructions for the mechanical arm to physically couple to the service object at the service point position.

25. The system of claim 24, wherein the service object comprises a lock, wherein the issue (h1) comprises:
   (h1) issue the instructions for the mechanical arm to perform a lock operation on the lock according to the service request.

26. The system of claim 24, wherein the service object comprises a physical item, wherein the issue (h1) comprises:
   (h1) issue the instructions for the mechanical arm to perform a physical item operation on the physical item according to the service request.

27. The system of claim 23, wherein the mechanical arm comprises one or more sensors, wherein the issue (h) comprises:
   (h1) issue the instructions for the mechanical arm to perform a sensor operation at the service point position using the one or more sensors.

\* \* \* \* \*